United States Patent
Cunningham

(10) Patent No.: US 10,514,459 B2
(45) Date of Patent: Dec. 24, 2019

(54) ACOUSTIC THERMOMETER

(71) Applicant: Robert Thomas Brent Cunningham, San Diego, CA (US)

(72) Inventor: Robert Thomas Brent Cunningham, San Diego, CA (US)

( * ) Notice: Subject to any disclaimer, the term of this patent is extended or adjusted under 35 U.S.C. 154(b) by 0 days.

(21) Appl. No.: 15/406,201

(22) Filed: Jan. 13, 2017

(65) Prior Publication Data

US 2018/0202867 A1    Jul. 19, 2018

(51) Int. Cl.
*G01K 3/04* (2006.01)
*G01S 17/08* (2006.01)

(52) U.S. Cl.
CPC ................ *G01S 17/08* (2013.01)

(58) Field of Classification Search
CPC ........... G01K 11/22; G01K 3/02; G01S 17/08
See application file for complete search history.

(56) References Cited

U.S. PATENT DOCUMENTS

| | | | | |
|---|---|---|---|---|
| 3,595,082 A * | 7/1971 | Miller, Jr. | ............... | G01K 11/26 374/119 |
| 4,513,749 A * | 4/1985 | Kino | ........................ | A61N 7/02 374/119 |
| 4,772,131 A * | 9/1988 | Varela | ..................... | G01K 11/24 374/119 |
| 5,624,188 A * | 4/1997 | West | ..................... | G01K 11/24 374/119 |
| 6,046,674 A * | 4/2000 | Irwin | ..................... | G01K 1/024 340/506 |
| 6,386,757 B1 * | 5/2002 | Konno | ...................... | G01J 5/02 374/158 |
| 7,611,278 B2 * | 11/2009 | Hollander | ............. | G01J 5/0044 374/121 |
| 2006/0203877 A1 * | 9/2006 | Heyman | ................ | G01K 11/22 374/117 |

* cited by examiner

*Primary Examiner* — Charlie Y Peng

(57) ABSTRACT

Provided herewith is a thermometer that calculates an average temperature between a starting point and a target surface. Also provided is a method of calculating an average temperature in an open space, between a starting point and a target surface. In additional embodiments, a method of calculating a two dimensional average temperature gradient in an open space is provided. Further provided is a method of calculating a three dimensional average temperature gradient in an open space.

18 Claims, 2 Drawing Sheets

ACOUSTIC THERMOMETER

The present applications claims priority to the earlier filed provisional application having Ser. No. 62/278,922, and hereby incorporates subject matter of the provisional application in its entirety.

BACKGROUND OF THE INVENTION

(1) Field of the Invention

This invention relates to an apparatus and a method for quantitatively determining the average temperature between two or more points in a room or other open space utilizing acoustical thermometry.

(2) Description of the Related Art

One common type of temperature sensor is a resistance temperature detector. Resistance temperature detectors calculate temperature by measuring the resistance to the flow of an electric charge in a metal. (See, e.g., U.S. Pat. No. 2,470,653). This electrical resistance is a function of temperature. Another common type of temperature sensor is a thermocouple sensor. Thermocouples utilize the principle that when a conductive material is subjected to a temperature gradient, a voltage develops at the unconnected ends of the conductor. Thermocouple sensors correlate the developed voltage to a temperature reading. (See, e.g., U.S. Pat. No. 3,244,005).

Resistance temperature detectors, and thermocouple sensors present the problem of requiring instrumentation to be in contact with or installed within the medium in question. This problem can limit the application of these types of sensors to easily accessible locations and locations in which instrumentation will not be subjected to harsh environments that could cause damage. In addition, if it is desired to take temperature readings over a broad area, many sensors are required in order to accurately represent the medium in question.

Applications of acoustic thermometry calculate temperature by measuring the travel time of sound waves over a certain distance. The speed of sound, traveling through a medium is a function of the medium temperature. In order to determine the speed of sound, the distance over which the sound waves travel must be known. Existing prior art contains apparatuses that calculate temperature by means of sound waves. (U.S. Pat. Nos. 6,726,359 and 5,624,188). The existing devices present the problem of either requiring that sound wave travel distance is known, (U.S. Pat. No. 5,624,188) or introducing inaccuracy into the measurement by approximating the sound wave travel distance (U.S. Pat. U.S. Pat. No. 6,726,359). The present invention addresses these problems.

BRIEF SUMMARY OF THE INVENTION

Provided herewith is a thermometer that calculates an average temperature between a starting point and a target surface. The thermometer comprises a rangefinder that measures a distance between a starting point and the target surface; a sound wave generating component that generates sound waves and measures the time required for the sound waves to travel from the starting point to the target surface and return to the thermometer; and a processing component for calculating average temperature from the measured distance and sound wave travel time.

Also provided is a method of calculating an average temperature in an open space, between a starting point and a target surface. The method comprises using the above thermometer to measure the distance between the starting point and the target surface and calculating the average temperature in that distance.

In additional embodiments, a method of calculating a two dimensional average temperature gradient in an open space is provided. This method comprises using the above thermometer and method to measure the average temperature between a starting point and a target surface at a series of co-planar locations.

Further provided is a method of calculating a three dimensional average temperature gradient in an open space. The method comprises using the above thermometer and method to measure the average temperature between a starting point and a target surface at a series of at least three intersecting points wherein the line defined by an intersecting starting point and an intersecting target surface point, intersect a plane defined by the first series of co-planar locations at a second series of at least three intersecting points wherein the line defined by an intersecting starting point and an intersecting target surface point, intersect a plane defined by the first series of co-planar locations.

BRIEF DESCRIPTION OF THE DRAWINGS

FIG. 1 includes element 15. Element 15 does not reference any single component of an embodiment of the invention, rather 15 refers to the device as a whole (eg "the thermometer"). For clarity, 15 or an equivalent is not included in FIG. 2.

DETAILED DESCRIPTION OF THE INVENTION

Figure 1:
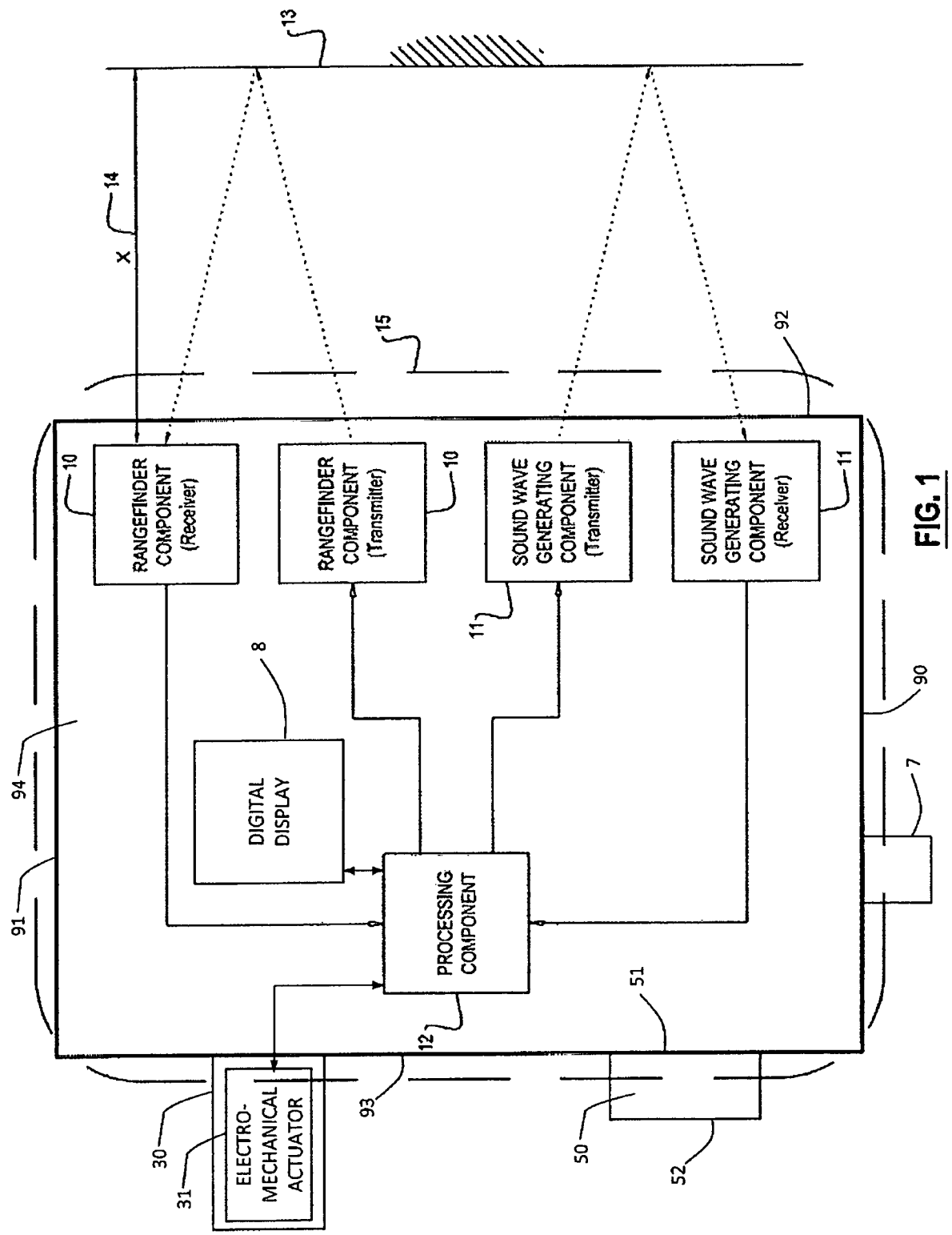
FIG. 1 is a block diagram that illustrates a basic implementation of the invention.

As used herein, the singular forms "a", "an" and "the" are intended to include the plural forms as well, unless the context clearly indicates otherwise. Additionally, the use of "or" is intended to include "and/or", unless the context clearly indicates otherwise.

In a thermometer implementing principles of the invention, the thermometer accurately measures the sound wave travel distance and incorporates the distance measurement into the temperature calculation. In one embodiment, this distance measurement is taken by a laser range finding component. Advantageously, a thermometer capable of accurately measuring distance will allow a user to operate the thermometer without first entering in a distance value each time the thermometer is adjusted or moved to a new location. In addition, an apparatus implementing principles of the invention will be capable of determining average temperatures with a higher degree of accuracy than existing devices.

A thermometer that implements principles of the invention will calculate temperature based on the principle that the speed at which sound travels through air is a function of temperature. The speed of sound traveling through air is expressed as:

$$v_{sound} = \sqrt{\frac{\gamma * R * T}{M}} \ [m/s] \quad \text{[Equation 1]}$$

where:
  γ, the adiabatic constant=1.4 [no units]
  R, the universal gas constant=8314.47 [J/(kmol*K)]
  T, absolute temperature [Kelvin]
  M, molecular weight of air=28.967 [kg/kmol]
Solving for T, Equation 1 can be expressed as:

$$T = \frac{v_{sound}^2 * M}{\gamma * R} \quad [\text{Kelvin}] \qquad [\text{Equation 2}]$$

The speed of sound can also be expressed as:

$$v_{sound} = \frac{2 * X}{Tm} \quad [m/s] \qquad [\text{Equation 3}]$$

Where:
  X=distance [m]
  Tm=time of acoustic flight [s]

A thermometer implementing principles of the invention will determine the speed of sound ($v_{sound}$) according to Equation 3. In no particular order, the rangefinder component (10) will determine a distance (X) between the thermometer (15), or other starting point, and a target surface (13), and the sound wave generating component (11) will determine travel time of sound of distance X by sending a sound wave and measuring time required for the sound wave to reflect off of the target surface and return to the sound wave generating component (11). Based on these measurements, the processing component (12) may calculate the average temperature using Equation 2.

In some embodiments of the invention, a thermometer is provided that calculates an average temperature between a starting point and a target surface. The thermometer comprises a rangefinder that measures a distance between a starting point and the target surface, a sound wave generating component that generates sound waves and measures the time required for the sound waves to travel between the target surface and return to the thermometer, and a processing component for calculating the average temperature from the measured distance and sound wave travel time.

FIG. 1 is a basic illustration of this first aspect. The processing component (12) sends a command to the rangefinder component (10). The rangefinder component measures the distance between the thermometer (15) and the target surface (13). FIG. 1 represents this unknown distance as X (14). The rangefinder component then transmits the distance measurement to the processing component (12) to be used in the temperature calculation. The processing component (12) also sends a command to the sound wave generating component (11). The sound wave generating component transmits sounds waves toward a target surface (13), and receives the sound waves after they have been reflected off of the target surface (13). In some embodiments, the sounds wave generating component (11) measures the sound wave time of flight and sends this measurement to the processing component (12). In those embodiments, the sounds wave generating component (11) includes its own processing (i.e. clock timing, trigger system, etc.), In other embodiments, the main processor (12) provides all timing, triggering, and temperature calculating for the laser sensor and ultrasonic transducer sensor.

The processing component (12) calculates average temperature based on the measured distance between the thermometer (15) and the target surface (13), and the sound wave time of flight.

Figure 2:
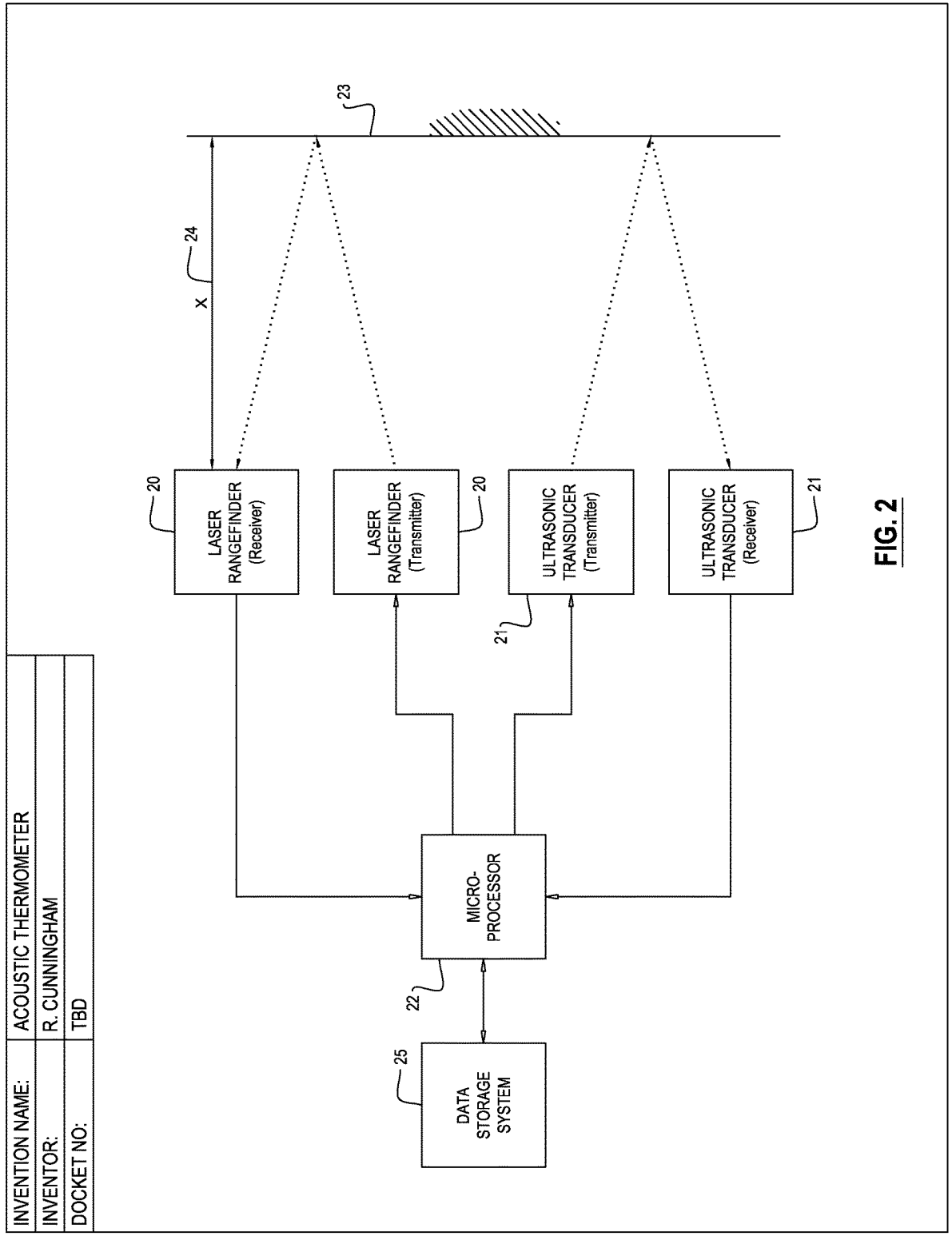
FIG. 2 is a block diagram illustrating a typical implementation of the invention.

In various embodiments the rangefinder component (10) comprises a laser rangefinder (20) as is shown in FIG. 2. The laser rangefinder is used to include laser range finding components that employ electronic distance measuring techniques such as laser phase shift, laser pulse time-of-flight, as well as laser range finding components that utilize a hybrid technique of both laser phase shift and laser pulse time-of-flight. Additionally, in at least one important implementation of the invention, the laser rangefinder will be compliant with certain safety standards. For example, in certain embodiments of the invention where its application raises eye safety concerns, the laser rangefinder would be class 2 according to IEC60825-1: 2007.

In other embodiments, the sound generating component (11) may comprise an ultrasonic transducer (21) as is shown in FIG. 2. In the description of the present invention, ultrasonic transducer means a component that is capable of converting sound wave energy into an electrical signal, and optionally, is also capable of transmitting the ultrasonic sound wave.

The processing component (12) of the thermometer (15) may comprise a microprocessor (22). In the description of the present invention, microprocessor (22) is used to mean an electronic circuit that interprets and executes programmed instructions, that may or may not incorporate a central processing unit as part of the circuit, to interpret and execute programmed instructions. (See David Garrod, Microprocessor, in Garrod Patent Glossary of Jud. Claim Constrs. In the Elecs., Comput. & Bus. Method Arts (2010.)

Additionally, the microprocessor (22) may, or may not include memory and other associated circuits.

The thermometer (15) may further comprise a data storage system (25). In the present invention the data storage system (25) describes any device or component that holds data. The memory structures utilized in the data storage system (25) include any circuit or device into which information can be stored or retrieved. (See David Garrod, Memory and Memory Means, in Garrod Patent Glossary of Jud. Claim Constrs. In the Elecs., Comput. & Bus. Method Arts (2011).) As it is used here, the data storage system (25) is inclusive of external storage such as disk drives, as well as internal memory such as random access memory. Implementation of the data storage system (25) is not meant to limit any data storage or memory capacity that may or may not be present in the processing component (12) or the microprocessor (22).

The thermometer (15) may further comprise a data transfer system for transferring data to a general purpose computer. In the present invention a data transfer system describes any system or mechanism that transfers data. (See David Garrod, Data Transfer System, in Garrod Patent Glossary of Jud. Claim Constrs. In the Elecs., Comput. & Bus. Method Arts (2010.) Additionally, the data transfer system may also receive data. Data transfer may be accomplished by means of a direct connection such as a USB cable. In some embodiments of the invention, data transfer may also be accomplished wirelessly such as via Bluetooth® or other wireless network.

In various embodiments, the thermometer (15) comprises a temperature control component. The temperature control component is capable of interfacing with an external climate control system. The interface to an external climate control system may be accomplished through a command sent by the microprocessor (22) or equivalent. Inclusion of a temperature control component is not intended to limit functionality of the microprocessor, but in some embodiments the temperature control component may be separate from the microprocessor.

The thermometer (15) may additionally comprise a housing (9) having an inside (94) wherein other thermometer components are enclosed and protected, an outside (91), a front side (92) and a back side (93).

In further embodiments, the thermometer (15) comprises a digital display (8) which is fixedly mounted to the front side of the housing (90), and electrically connected to the processing component. In the present invention "digital display" describes a screen or other image projection that displays data and/or images. For example, some embodiments of the present invention may utilize a digital display such as an LCD display, or an LED display. Some embodiments may also include a digital display that allows the user to interface with the device by touching the screen.

The thermometer (15) may comprise a handgrip (7), which is mountably attached to the outside (91) of the thermometer housing (90), allowing a user to hold and operate the thermometer by hand.

In other embodiments the thermometer (15) can additionally comprise a battery compartment and battery terminals, enclosed in said housing (90), for receiving and removeably connecting to one or more batteries. In embodiments of the invention where the data storage system (25) utilizes RAM memory, or an equivalent, the battery compartment may also include a means to maintain a charge to the data storage system, such as a dedicated circuit, when batteries are removed from the thermometer or become completely drained. In embodiments of the invention that allow the thermometer to be connected to an AC power supply, the battery compartment may also include circuitry that allows batteries to act only as an auxiliary source of power when the thermometer is connected to the AC power source.

The thermometer (15) can also comprise a receiving terminal located on the outside (91) of the thermometer (15) housing (90), configured to receive AC power for recharging of said battery or batteries. The receiving terminal may take forms such as a USB or other port-style connection wherein a power supply cord may be directly connected to the thermometer. In embodiments of the invention that include a data transfer system, such direct connection may serve to both charge the batteries, and transfer data.

In various embodiments the thermometer (15) comprises a wall mounting bracket (50), having a bracket back side (52), mountably connected to a wall surface, and a bracket front side (51), that engagedly connects to the back of the thermometer housing (90).

The thermometer (15) may further comprise an alignment varying mechanism (30) to vary alignment of the laser rangefinder (20) and the ultrasonic transducer (21). Such an alignment mechanism may comprise a structure such as a solenoid (31), electrically connected to the processing component (12), and mechanically connected to the laser rangefinder (20) and the ultrasonic transducer (21). Another example of possible structure for the varying mechanism is a linear actuator (31), electrically connected to the processing component (12), and mechanically connected to the laser rangefinder (20) and the ultrasonic transducer (21).

The potential benefit that this particular embodiment gives to the marketplace is notable. This function will allow a single thermometer to measure average temperatures at many different locations within a single space. One significant benefit of this function is that it allows building owners or managers to use energy more efficiently. For example, consider a refrigerated warehouse, having a target temperature of 40° F. or below, containing a northeast quadrant where the instantaneous temperature is at 45° F. An embodiment of the present invention that implemented the varying mechanism would enable broad temperature monitoring of the refrigerated warehouse with a single device, and could detect that only the northeast quadrant of the ware house needed a temperature adjustment.

In one embodiment of the invention there is provided a handheld thermometer (15). The handheld thermometer (15) is capable of measuring distances and the time required for a sound wave to travel between a starting point and a target surface (14). Based on a distance measurement between the starting point and target surface (14), and the sound wave travel time, the handheld thermometer (15) calculates an average temperature between the starting point and the target surface (14). In this embodiment the handheld thermometer (15) comprises a housing (90), having an inside (94) wherein other thermometer components are enclosed and protected, an outside (91), a front side (92) and a back side (93). A handgrip (7), may be mountably attached to the outside (91) of said housing (90), which will allow a user to hold and operate the thermometer by hand. The handheld thermometer further comprises a laser range finder, an ultrasonic transducer and a microprocessor, all of which are enclosed in the housing (90). The laser rangefinder measures a distance between the thermometer and the target surface. The ultrasonic transducer will generate sound waves and measure the time required for the sound waves to travel to the target surface and return to the thermometer. The microprocessor (22) will be electrically connected to the laser range finder and the ultrasonic transducer. The micro-processor will calculate average temperature, based on the measured distance and sound wave travel time. The handheld thermometer (15) will further comprise a digital display (8) which will be electrically connected to the microprocessor (22) component, and will display the average calculated temperature. This embodiment may receive power via a battery. A battery compartment and battery terminals, enclosed in said housing (90), will facilitate receiving and removeably connecting one or more batteries to the thermometer. Lastly, the handheld thermometer (15) may comprise a receiving terminal located on the outside (91) of the housing (90), configured to receive AC power for recharging of the battery or batteries.

Also provided is a method of calculating an average temperature in an open space, between a starting point and a target surface. The method comprises using the above thermometer to measure the distance between the starting point and the target surface and calculating the average temperature in that distance.

The method is not limited by the magnitude of the distance between the starting point and the target surface. Thus, in various implementations of the method, the starting point is located on an atomic molecule and the target surface is located on another atomic molecule. In another implementation of the method, the target surface is located on another celestial body. In other method implementations of the invention, the starting point and target surface are located beneath the surface of a liquid, or on the body of a living creature or human being.

Further provided is a method to calculate a two dimensional average temperature gradient in an open space, using at least one of the above described thermometers, by measuring the average temperature between a starting point and a target surface at a series of co-planar locations. In another aspect of the method implementation, the average temperature data at the co-planar locations may be transferred to a general purpose computer, and optionally plotted.

Other implementations of the method may be used to calculate a three dimensional average temperature gradient in an open space, using at least one of the previously described thermometers and the method for calculating a two dimensional average temperature gradient in an open space, by measuring the average temperature between a starting point and a target surface at a second series of at least three intersecting points wherein the line defined by an intersecting starting point and an intersecting target surface point, intersect a plane defined by the first series of co-planar locations. In another aspect of the method implementation used to find an average three dimensional temperature gradient, the average temperature data at the co-planar locations is transferred to a general purpose computer, and optionally plotted.

REFERENCES

Acoustic Thermometer, U.S. Pat. No. 5,624,188.
Apparatus and Method of Detecting the Room Temperature by Means of Sound Waves, U.S. Pat. No. 6,726,359.
Resistance Thermometer, U.S. Pat. No. 2,470,653.
Temperature measuring apparatus, U.S. Pat. No. 3,244,005.
Joseph Priest, *Temperature and Its Measurement*, in ENCYCLOPEDIA OF ENERGY (1st ed. 2004).
P. R. N. Childs et al., *Review of Temperature Measurement*, 71 REV. SCI. INST. 2959 (2000).
David Garrod, *Data Transfer System*, in Garrod Patent Glossary of Jud. Claim Constrs. In the Elecs., Comput. & Bus. Method Arts (2011).
David Garrod, Memory, in Garrod Patent Glossary of Jud. Claim Constrs. In the Elecs., Comput. & Bus. Method Arts (2011).
David Garrod, *Memory Means*, in Garrod Patent Glossary of Jud. Claim. Constrs. In the Elecs., Comput. & Bus. Method Arts (2011).
David Garrod, *Microprocessor*, in Garrod Patent Glossary of Jud. Claim. Constrs. In the Elecs., Comput. & Bus. Method Arts (2011).

In view of the above, it will be seen that several objectives of the invention are achieved and other advantages attained.

As various changes could be made in the above methods and compositions without departing from the scope of the invention, it is intended that all matter contained in the above description and shown in the accompanying drawings shall be interpreted as illustrative and not in a limiting sense.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

What is claimed is:

1. A thermometer that calculates an average temperature between a starting point and a target surface, the thermometer comprising: (a) a rangefinder that measures a distance between a starting point and the target surface; (b) a sound wave generating component that generates sound waves and measures the time required for the sound waves to travel from a starting point to the target surface and return to the starting point; (c) a processing component for calculating average temperature from the measured distance and sound wave travel time; (d) a housing having an inside wherein other thermometer components are enclosed and protected, an outside, a front side and a back side; and (e) an alignment varying mechanism to vary alignment of the rangefinder and the sound wave generating component.

2. The thermometer of claim 1, wherein the rangefinder comprises a laser range finder.

3. The thermometer of claim 1, wherein the sound wave generating component comprises an ultrasonic transducer.

4. The thermometer of claim 1, further comprising a data storage system.

5. The thermometer of claim 1, further comprising a data transfer system for transferring data to a computer.

6. The thermometer of claim 1, further comprising a temperature control component for controlling and setting a desired room temperature.

7. The thermometer of claim 1, further comprising a digital display fixedly mounted to the front side of the housing, and electrically connected to the processing component.

8. The thermometer of claim 1, further comprising a handgrip, mountably attached to the outside of said housing, that allows a user to hold and operate the thermometer by hand.

9. The thermometer of claim 1, further comprising a wall mounting bracket, having a bracket back side, mountably connected to a wall surface, and a bracket front side, that engagedly connects to the back of said thermometer housing.

10. The thermometer of claim 1, wherein the mechanism to vary the alignment comprises an electromechanical actuator, electrically connected to the processing component, and mechanically connected to the laser rangefinder and the ultrasonic transducer.

11. A method of calculating an average temperature in an open space, between a starting point and a target surface, using the thermometer of claim 1, the method comprising measuring a distance between the starting point and the target surface.

12. The method of claim 11, further comprising emitting sound waves, directed toward the target surface to travel between the starting point and reflect off of the target surface.

13. The method of claim 12, further comprising receiving said sound waves back at the starting point after said sound waves have been reflected off of the target surface.

14. The method of claim 13; further comprising measuring a travel time for said sound waves to travel to the target surface and return to the starting point.

15. The method of claim 14, further comprising calculating an average temperature between the starting point and the target surface based on the distance measurement and a sound wave travel time measurement.

16. A method of calculating a two dimensional average temperature gradient in an open space using the thermometer of claim 1, and the the method of claim 11, further comprising measuring the average temperature between a starting point and a target surface at a series of co-planar locations.

17. The method of claim 16, further comprising transferring a data set of average temperatures to a computer.

18. A method of calculating a three dimensional average temperature gradient in an open space using the thermometer of claim 1, and the the method of claim 16 further comprising measuring the average temperature between a starting point and a target surface at a second series of at least three intersecting points wherein the line defined by an intersecting starting point and an intersecting target surface point, intersect a plane defined by the first series of co-planar locations.

* * * * *